May 8, 1923.

I. ARTHURS

DIRIGIBLE HEADLIGHT

Filed Jan. 14, 1922

WITNESSES
R. A. Thomas

Irvin Arthurs INVENTOR

BY Victor J. Evans ATTORNEY

May 8, 1923.
1,454,260
I. ARTHURS
DIRIGIBLE HEADLIGHT
Filed Jan. 14, 1922
3 Sheets-Sheet 2
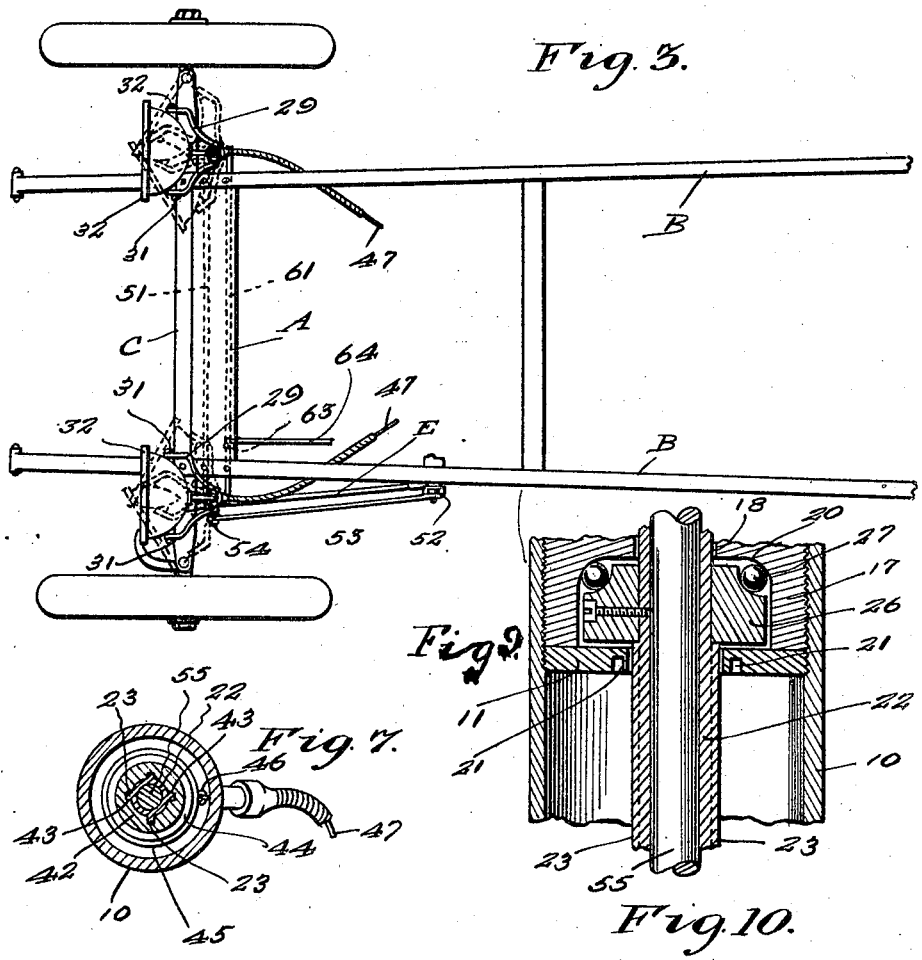
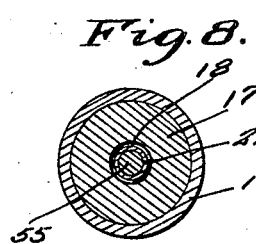
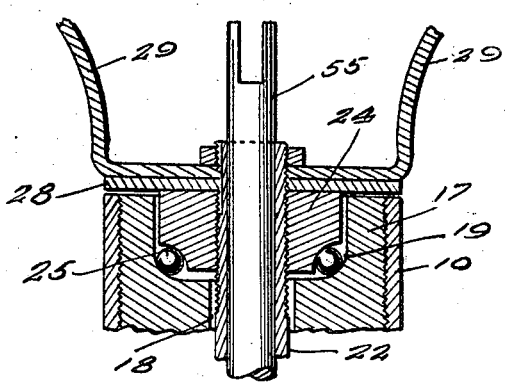
Irvin Arthurs INVENTOR
BY *Victor J. Evans*
ATTORNEY May 8, 1923.

I. ARTHURS

DIRIGIBLE HEADLIGHT

Filed Jan. 14, 1922

Irvin Arthurs INVENTOR

Patented May 8, 1923.

1,454,260

UNITED STATES PATENT OFFICE.

IRVIN ARTHURS, OF BELLS LANDING, PENNSYLVANIA.

DIRIGIBLE HEADLIGHT.

Application filed January 14, 1922. Serial No. 529,334.

*To all whom it may concern:*

Be it known that I, IRVIN ARTHURS, a citizen of the United States, residing at Bells Landing, in the county of Clearfield and State of Pennsylvania, have invented new and useful Improvements in Dirigible Headlights, and of which the following is a specification.

This invention relates to headlights for automobiles, and has for its object the provision of a novel headlight mounting whereby the headlights may be caused to turn automatically in accordance with the turning of the front wheels of the vehicle during steering so that the light from the headlights or lamps will be thrown directly upon the road in the path of travel of the vehicle even though going around curves or making turns.

An important object is the provision of a dirigible headlight mounting which is so constructed that the headlights may be held stationary so as not to turn when the vehicle is driven in the day time, the means for holding the headlights stationary being so constructed and arranged that one headlight may be held stationary and the other be permitted to turn with the wheels if preferred.

Another important object is the provision of a headlight mounting which is so constructed that the headlights may be tilted forwardly and downwardly at the will of the operator whereby to avoid blinding the driver of an approaching car, this downward tilting of the headlights taking the place of the usual dimming devices resorted to and being a distinct improvement thereover in view of the fact that the dimmer headlights commonly used at present have caused many accidents, as the drivers of cars thus equipped have been unable to see the road plainly.

Another object is the provision of a headlight mounting of this character of such arrangement that the headlights may be tilted downwardly if desired even while the vehicle is rounding a corner, this downward tilting of the headlights not in any way interfering with the movement of the headlights to correspond with the movement of the front wheels of the vehicle.

Still another object is the provision of a headlight mounting of this character which is so constructed and arranged that either or both of the headlights may be disconnected from their operating means and be turned in any direction, as for instance turned so as to direct the light onto the engine in case it is necessary to stop by the road side and make any repairs or adjustments, the means for effecting this disconnection of the headlights proper with their operating means being readily controllable from the dash of the machine so as to be within convenient reach of the driver at all times.

Still another object is the provision of a mounting of this character in which either or both of the headlights when disconnected from their operating means and turned to face in any desired direction may be locked so as to remain fixed in such position for any desired length of time.

An additional object is the provision of a mounting of this character which will be comparatively simple and inexpensive in manufacture, easy to install, highly efficient in use, easy to control and adjust, positive in action, durable in service and a general improvement in the art.

With the above and other objects and advantages in view, the invention consists in the details of construction to be hereinafter more fully described and claimed, and illustrated in the accompanying drawings in which, Figure 1 is a front elevation of a vehicle equipped with my device.

Figure 3 is a plan view of the chassis showing the headlight operating means associated therewith and showing by dotted lines the different possible positions of the headlights.

Figures 7 and 8 are cross-sectional views therethrough and,

Figure 1:
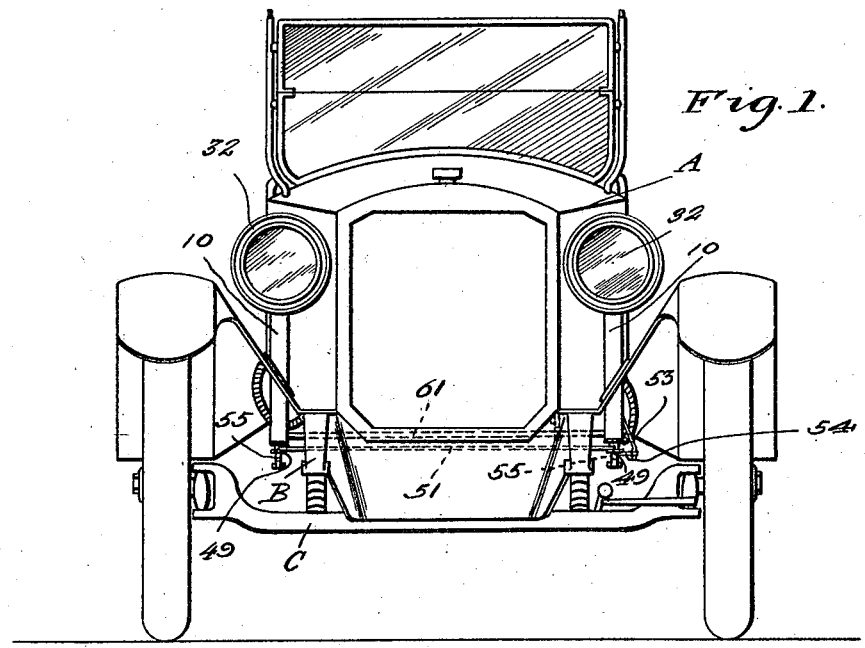
Figure 2:
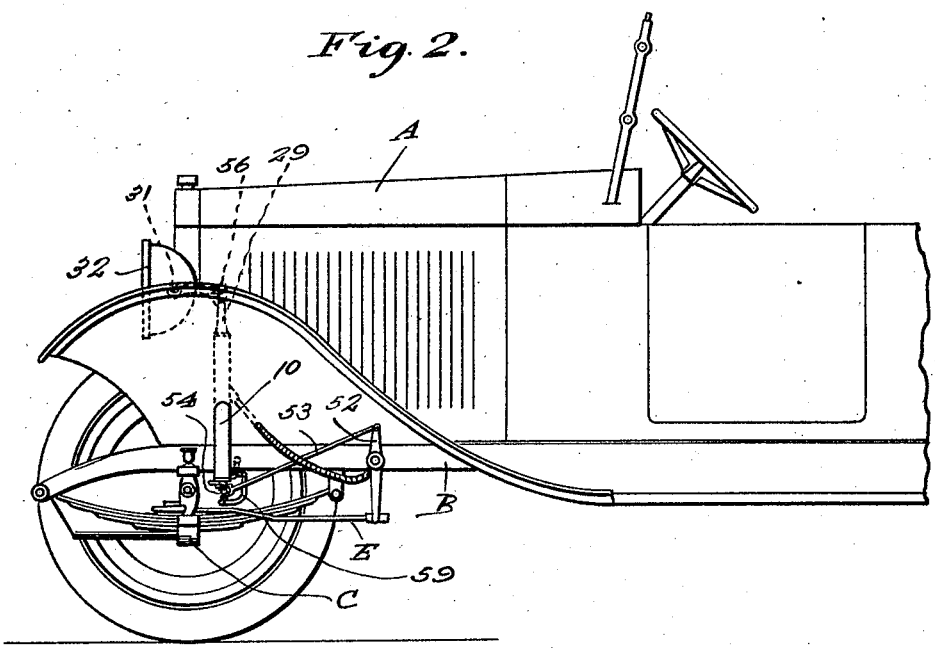
Figure 2 is a side elevation thereof.
Figures 4, 5, 6:
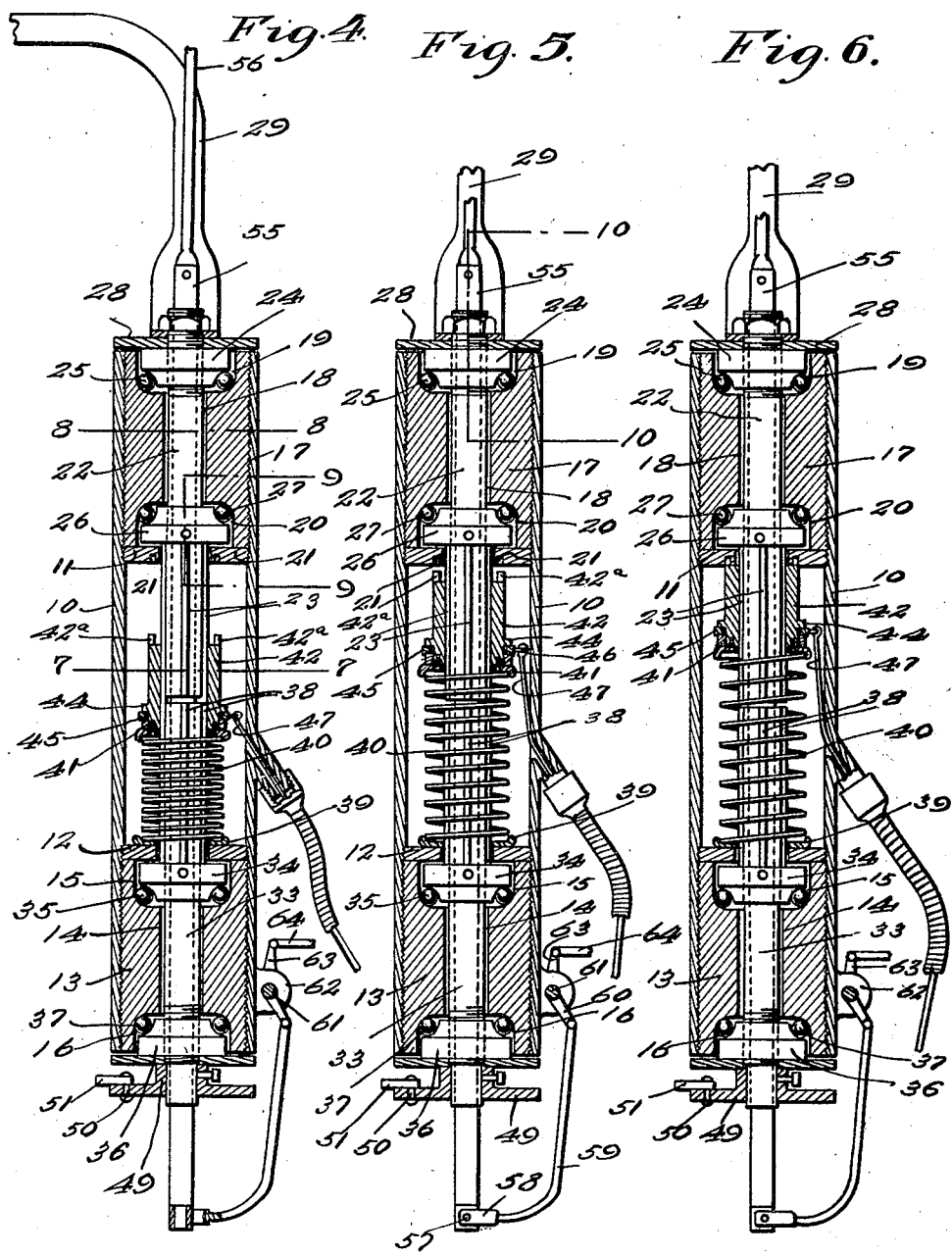
Figure 4 is a vertical longitudinal sectional view taken through one of the headlight mountings and showing the parts in normal position.
Figure 5 is a similar view showing the headlights as capable of remaining stationary.
Figure 6 is a similar view showing the clutch mechanism released whereby a headlight may be turned at any angle and locked.

The remaining Figures 9 and 10 are detail views.

Referring more particularly to the drawings the letter A designates the front portion of an automobile including the usual frame bars B, the front axle C, the fenders D and the steering arm connecting rod E which is of course moved as the steering wheel of the vehicle is moved for effecting turning or steering of the vehicle during its travel. These parts are all well known and form no part of the present invention but are shown and described as my dirigible headlight mounting is associated with these elements.

In carrying out my invention I provide a pair of upright tubular casings 10 which are secured by any desired means either upon the fenders 10, the frame bars B or upon whatever brace rod might be used for reinforcing and supporting the fenders with respect to the frame bars. The opposite end portions of the casings 10 are internally threaded as shown and screwed into these threaded portions are upper and lower disks 11 and 12 respectively which of course must be provided with suitable openings for engagement by a spanner wrench or the like whereby they may be turned. Threaded into the lower portion of the tubular casing 10 is a cylindrical plug 13 which is provided with a central bore 14 and which is formed at its upper and lower end with ball races 15 and 16 respectively. Secured within the upper end of each tubular casing 10 is a similar plug 17 having a central bore 18 and formed at its upper and lower end with ball races 19 and 20 respectively. It should be mentioned in passing that the uppermost disk 11 is formed on its under surface with a plurality of notches or recesses 21 for a purpose to be described.

Rotatably mounted within the bore 18 of the upper plug 17 is a sleeve 22 which has its end below the disk 11 formed with ribs 23. Secured upon the upper portion of the sleeve 22 is a cone 24 coacting with balls 25 located in the race 19 while secured upon the intermediate portion thereof is a cone 26 coacting with balls 27 located in the race 20. Secured upon the sleeve 22 is a disk cap 28 which fits upon and closes the top of the casing 10 for excluding dirt, dust and water.

Carried by the upper extremity of the sleeve 22 is a bracket 29 of V shape having the upper ends of its arms directed forwardly and having pivoted therebetween, as shown at 31, the head lamp 32.

Rotatably mounted within the bore 14 of the lower plug 13 is a tubular sleeve 33 upon the intermediate portion of which is secured a cone 34 coacting with balls 35 in the race 15 while secured upon its lower portion is a cone 36 coacting with balls 37 in the race 16. Above the disk 12 the sleeve 33 is formed with ribs 38 similar to the ribs 23, for a purpose to be described.

Slidable upon the sleeve 33 above the lower disk 12 is a washer 39 against which abuts one end of a coil spring 40 which surrounds the sleeve 33 and which has its upper end abutting against a washer 41 which is slidably mounted upon the upper portion of the sleeve 33. By this construction it will be seen that the spring 40 normally tends to urge the washer 41 upwardly at all times.

Slidably mounted upon the upper end of the lower sleeve 33 and the lower end of the upper sleeve 22 is a sleeve 24 which is formed at its inner periphery with a plurality of longitudinally extending grooves 43 slidably engaged upon the ribs 38 and 23 and normally serving to connect the two sleeves 22 and 33 so that they will turn in unison. At its lower end the sleeve 42 carries a grooved collar 44 within which is engaged a ring 45 which has one side provided with a laterally extending lug 46 with which is connected a flexible member 47 such as wire or the like, leading through a flexible tubing 48 extending through one side of the casing 10 and extending to the dash of the vehicle. The purpose of the wire 47 and ring 45 is to effect movement of the sleeve 42 longitudinally upon the sleeves 22 and 33 whereby to couple them together or whereby the sleeve 42 may be disposed entirely upon the upper sleeve 22 so as to break the connection between the two sleeves 32 and 33. As the washer 41 is secured to the lower end of the sleeve 42 it will be apparent that the tendency of the spring 40 is to urge the sleeve 42 upwardly into its uncoupling position. It is of course understood that some suitable means must be provided upon or near the dash of the vehicle within convenient reach of the operator for holding the flexible member 47 under tension so that the sleeve member 42 will be in its lower position engaging both of the sleeves 22 and 23 for connecting them for simultaneous movement. The upper end of the sleeve 42 is formed with teeth or lugs 42$^a$.

Secured upon the lower projecting end of the sleeve 33 is a collar 49 with which is pivotally connected, as shown at 50, a rod 51 which is similarly connected with the mounting of the other lamp whereby they will both be operated simultaneously. Associated with the steering rod E of the vehicle is a suitable clamp 52 with which is connected a rod 53 which is pivotally connected with an arm 54 extending from the collar 49.

Slidable longitudinally through both of the sleeves 22 and 33 and rotatable with respect thereto is a vertically extending shaft 55 which projects beyond the top of the upper sleeve 22 and which has its upper projecting end bifurcated and pivotally connected with an arm 56 which is pivotally connected with the rear of the headlamp 32. Extending transversely through the lower end of the shaft 55 which projects below the lower end of the sleeve 33 is a pin 57 which extends transversely of a fork 58 provided at the lower end of a curved upstanding arm 59 which has its upper end pivotally connected with a lateral arm 60 formed on a rock shaft 61 which is pivoted or rotatable within spaced apertured ears 62 carried by or formed upon the casing 10. This rock shaft 61 is further provided with a second arm 63 with which is connected a control rod 64 leading to and through the dash of the vehicle and cooperating with any suitable means whereby this rod 64 may be held in selected positions.

Assuming that the device has been constructed and assembled as above described, the operation is as follows;

At night, when it is desired that the lamps turn in accordance with the turning movement of the front wheels of the vehicle as when going around corners, making turns and the like, the operator so disposed whatever means is provided for holding the wires 47 that the movable sleeves 42 will be in their lowermost position, coupling together the sleeves 22 and 33. As the vehicle is steered in one direction or the other it is apparent that the corresponding movement of the steering arm connecting rod E will be transmitted to the rod 51 which is pivotally connected with the collar 49 and this will of course correspondingly rotate the lower sleeve 33 and consequently the upper sleeve 22 which carries the bracket 29 upon which the headlamp is secured. It is of course apparent that movement in both of the devices will be the same owing to the fact that they are both connected by the rod 51 which extends across the front of the vehicle. It will result in turning movement of the headlamp to correspond with the movement of the front wheels of the vehicle so that the light from the lamps will be thrown upon the road immediately in front of the vehicle regardless of the path thereof. Without interfering in this movement in any way it is of course apparent that the operator may move the rods 64 so as to swing the arms 63, shafts 61 and arms 59 whereby to move the arms 56 for sliding the shafts 55 upwardly for causing forward tilting of the headlamps 32 upon their brackets 29 so as to throw the light down upon the ground and avoid blinding drivers of approaching vehicles. It is believed that this action will be a distinct advantage over the use of the ordinary headlight dimming devices as these latter are frequently productive of accidents inasmuch as the degree of light is so small that the operator of vehicles are unable to see the road clearly. It is intended that the headlamps be tilted downwardly and forwardly only when meeting other vehicles and that after such vehicles have passed the operator should move the rods 64 in the other direction whereby to return the headlamps 32 to normal straight ahead position throwing the light far ahead on the road.

In case of engine trouble or in case any contingency should arise which would render it desirable to have light thrown upon the engine, or upon any other area near to the car and at the side or back thereof it is merely necessary that the operator move whatever means is associated with the wire or flexible member 47 so as to pull upon one or both of such wires to a certain extent which will release the flexible member 47 to a certain extent whereby to permit the spring 40 of each headlamp mounting to force the movable sleeve 42 upwardly so that it will disengage the lower sleeve 33. When this is done it will be apparent that the headlamps may be turned in any direction so that light may be thrown upon the engine when the hood is lifted or be thrown upon the ground at the side or back of the machine as the case may be. For daylight driving when it is not desired to have the headlamps turn with the wheels the operator may entirely release whatever holding means is associated with the wires 47 whereupon the springs 40 in both of the mountings will operate to push the movable sleeves 42 upwardly entirely out of engagement with the lower sleeves 33 and into engagement with the upper disks. Owing to the fact that the upper ends of the movable sleeves 42 are formed with teeth $42^a$ it will be seen that the teeth will engage within the recesses 21 in the underside of the upper disks 11 whereupon the headlamps will be held absolutely stationary with respect to their casings so that they will not turn with the front wheels of the vehicle.

From the foregoing description and a study of the drawings it will be apparent that I have thus provided a simply constructed and consequently inexpensive mounting for headlights of automobiles and other similar vehicles whereby the headlights may be caused to remain stationary as for instance in daylight driving, or whereby they may be caused to turn correspondingly with the front wheels during the steering of the vehicle in making turns and going around curves, the device furthermore so constructed that either headlight may be held still while the other is caused to turn and being also so arranged that either or both of the headlights may be entirely disconnected from their operating means and turned at any desired angle for any purpose whatsoever. It is to be noted that the forward tilting of the lamps when meeting other vehicles is a highly advantageous feature as it avoids blinding the drivers of approaching cars and consequently reduces accidents without the use of the entirely unsatisfactory dimming devices which are in common use and which almost entirely cut-off the light to such an extent that their use is an invitation to danger.

While I have shown and described the preferred embodiment of the invention, it is of course to be understood that I reserve the right to make such changes in the form, construction and arrangement of parts as will not depart from the spirit of the invention or the scope of the subjoined claims.

Having thus described my invention I claim:

1. A dirigible headlight mounting comprising an upright casing secured at the side of the forward end of a vehicle, a pair of sleeve members rotatably mounted within said casing and arranged in spaced end to end relation, headlamps carried by the upper ends of said sleeve members, means for locking the sleeve members together whereby to effect simultaneous movement thereof, and means connected with the lower end of the lowermost sleeve member and connected with the steering arm connecting rod of the vehicle.

2. A dirigible headlight mounting for motor vehicles comprising an upright casing secured at each side of the forward end of the vehicle, a pair of vertical aligned sleeve members rotatably mounted within each casing and having their inner ends spaced apart, brackets secured upon the upper ends of the uppermost sleeve members and carrying headlamps, arms connected with the lower ends of the lowermost sleeve members for effecting simultaneous movement thereof, an arm connected with the lower end of one of the lower sleeve members and connected with the steering arm connecting rod of the vehicle, a coupling sleeve slidably mounted upon the inner ends of said sleeves whereby to couple the same for simultaneous movement and dash control means for moving said coupling sleeves out of engagement with the lowermost sleeve member.

3. A dirigible headlight mounting for motor vehicles comprising an upright casing secured at each side of the forward end of the vehicle, a pair of vertically aligned sleeve members rotatably mounted within each casing and having their inner ends spaced apart, brackets secured upon the upper ends of the uppermost sleeve members and carrying headlamps, arms connected with the lower ends of the lowermost sleeve members for effecting simultaneous movement thereof, an arm connected with the lower end of one of the lower sleeve members and connected with the steering arm connecting rod of the vehicle, a coupling sleeve slidably mounted upon the inner ends of said sleeves whereby to couple the same for simultaneous movement and dash control means for moving said coupling sleeves out of engagement with the lowermost sleeve member, a coil spring within each casing normally urging the coupling sleeve upwardly, and a flexible member connected with each coupling sleeve and leading to a retaining means on the dash of the vehicle.

4. A dirigible headlight mounting for motor vehicles comprising an upright casing secured at each side of the forward end of the vehicle, a pair of vertically aligned sleeve members rotatably mounted within each casing and having their inner ends spaced apart, brackets secured upon the upper ends of the uppermost sleeve members and carrying headlamps, arms connected with the lower ends of the lowermost sleeve members for effecting simultaneous movement thereof, an arm connected with the lower end of one of the lower sleeve members and connected with the steering arm connecting rod of a vehicle a coupling sleeve slidably mounted upon the inner ends of said sleeves whereby to couple the same for simultaneous movement and dash control means for moving said coupling sleeves out of engagement with the lowermost sleeve member, a coil spring within each casing normally urging the coupling sleeve upwardly, and a flexible member connected with each coupling sleeve and leading to a retaining means on the dash of the vehicle, stationary members within the upper ends of the casing having their lower surfaces formed with teeth, and teeth on the upper surfaces of the slidable sleeve members engageable within said recesses whereby to hold the upper tubular members stationary.

5. A dirigible headlight mounting comprising an upright casing secured at each side of the forward end of a vehicle, a pair of vertically aligned spaced sleeve members rotatably mounted within each casing, a bracket secured upon the upper end of each upper sleeve member, a headlight pivotally mounted within each bracket, a vertically slidable sleeve member within each casing engaged upon the inner ends of said first named sleeve members whereby to couple the same to effect simultaneous movement thereof, means for sliding said sliding sleeve member for effecting the coupling or uncoupling action, means connected with the lower ends of the lowermost sleeve members and with the steering arm connecting rod of the vehicle, a shaft slidably and relatively rotatably mounted in the registering or aligning sleeve members, an arm connecting the upper end of said shaft with the rearmost edge or extremity of the associated headlamps, and means for moving said shaft vertically for tilting the associated headlamps.

6. A dirigible headlight mounting comprising an upright casing secured at each side of the forward end of a vehicle, a pair of vertically aligned spaced sleeve members rotatably mounted within each casing, a bracket secured upon the upper end of each upper sleeve member, a headlight pivotally mounted within each bracket, a vertically slidable sleeve member within each casing engaged upon the inner ends of said first named sleeve members whereby to couple the same to effect simultaneous movement thereof, means for sliding said sliding sleeve member for effecting the coupling or uncoupling action, means connected with the lower ends of the lowermost sleeve members, and with the steering arm connecting rod of the vehicle, a shaft slidably and relatively rotatably mounted in the registering or aligning sleeve members, an arm connecting the upper end of said shaft with the rearmost edge or extremity of the associated headlamps, and means for moving said shaft vertically for tilting the associated headlamps, said means comprising a rack shaft journaled at the lower portion of each casing and having two laterally extending arms, a link connected with one of said arms and with the lower end of the associated shaft, and a rod connected with the other arm and leading through the dash.

7. A dirigible headlight mounting for motor vehicles, comprising a casing secured at each side of the forward end of the vehicle, a pair of aligned sleeve members rotatably mounted within each casing, headlight carrying brackets carried by the upper sleeve members, means connected with the lower sleeve members for effecting turning movement thereof, and clutch means between the sleeve members for locking the same together.

8. A dirigible headlight mounting for motor vehicles, comprising an upright casing located at each side of the forward end of a vehicle, spaced sleeve members rotatable within each casing, a headlight carrying bracket carried by the upper sleeve member, means connected with the steering mechanism of the vehicle for turning the lower sleeve member, a clutch mechanism mounted between the sleeve members and normally locking the two together for simultaneous movement, and means for releasing said clutch mechanism for permitting the upper sleeve member to remain stationary when the lower sleeve member is moved.

In testimony whereof I affix my signature.

IRVIN ARTHURS.